(12) United States Patent
Fryman et al.

(10) Patent No.: US 9,459,949 B2
(45) Date of Patent: Oct. 4, 2016

(54) METHODS AND APPARATUS TO PROVIDE FAILURE DETECTION

(71) Applicant: Intel Corporation, Santa Clara, CA (US)

(72) Inventors: Joshua Bruce Fryman, Corvallis, OR (US); Allan Knies, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 14/477,438

(22) Filed: Sep. 4, 2014

(65) Prior Publication Data

US 2015/0089302 A1 Mar. 26, 2015

Related U.S. Application Data

(63) Continuation of application No. 13/538,596, filed on Jun. 29, 2012, now Pat. No. 8,832,505.

(51) Int. Cl.
*G06F 11/00* (2006.01)
*G06F 11/07* (2006.01)
*G06F 11/34* (2006.01)

(52) U.S. Cl.
CPC ............ *G06F 11/079* (2013.01); *G06F 11/076* (2013.01); *G06F 11/0709* (2013.01); *G06F 11/0757* (2013.01); *G06F 11/3476* (2013.01)

(58) Field of Classification Search
CPC ........... G06F 11/0709; G06F 11/0757; G06F 11/076; G06F 11/079; G06F 11/3476
See application file for complete search history.

(56) References Cited

U.S. PATENT DOCUMENTS

| 4,118,789 A | 10/1978 | Casto et al. |
| 6,658,602 B1 | 12/2003 | Nakano |
| 6,931,631 B2 | 8/2005 | Bates et al. |
| 7,143,270 B1 | 11/2006 | Rudd et al. |
| 7,581,090 B2 | 8/2009 | Miyake et al. |
| 7,873,879 B2 | 1/2011 | Arimilli et al. |

(Continued)

FOREIGN PATENT DOCUMENTS

| KR | 20-2010-0005613 | 6/2010 |
| WO | 2012000540 | 1/2012 |

OTHER PUBLICATIONS

Patent Cooperation Treaty, "International Search Report and Written Opinion," issued in connection with Application No. PCT/US2013/048111, Oct. 15, 2013, 9 pages.

(Continued)

*Primary Examiner* — Joshua P Lottich
(74) *Attorney, Agent, or Firm* — Hanley, Flight & Zimmerman, LLC (57) ABSTRACT

Methods and apparatus to provide failure detection are disclosed herein. An example method to synchronize data operations between multiple workload units in a computing device to facilitate failure detection includes identifying a number of first data operations to write data from a computing node in a first workload unit to locations that are not in a local cache of the computing node and are not in a memory of the first workload unit, the first data operations corresponding to a set of computing instructions that are assigned to the first workload unit and, when a flag in the first workload unit has been set to a first value, synchronizing the first data operations with second data operations by a second workload unit.

20 Claims, 7 Drawing Sheets

(56) References Cited

U.S. PATENT DOCUMENTS

| | | |
|---|---|---|
| 7,930,684 B2 | 4/2011 | Roeck et al. |
| 7,984,244 B2 | 7/2011 | Fryman et al. |
| 8,832,505 B2 | 9/2014 | Fryman et al. |
| 2002/0083375 A1 | 6/2002 | Indo |
| 2003/0005415 A1 | 1/2003 | Bates et al. |
| 2004/0123081 A1 | 6/2004 | Knies et al. |
| 2004/0243790 A1 | 12/2004 | Soltis, Jr. et al. |
| 2008/0115113 A1 | 5/2008 | Codrescu et al. |
| 2008/0270988 A1 | 10/2008 | Li et al. |
| 2008/0276226 A1 | 11/2008 | Farchi et al. |
| 2009/0113252 A1 | 4/2009 | Lambert et al. |
| 2010/0332801 A1 | 12/2010 | Fryman et al. |
| 2011/0016223 A1 | 1/2011 | Iannaccone et al. |
| 2011/0029958 A1 | 2/2011 | Kalra |
| 2011/0154000 A1 | 6/2011 | Fryman et al. |

OTHER PUBLICATIONS

"KIPRIS K2E Machine Translation of KR 20-2010-0005613," created on Oct. 26, 2013, 4 pages.

United States Patent and Trademark Office, "Notice of Allowance and Fee(s) Due," issued in connection with U.S. Appl. No. 13/538,596, May 1, 2014, 27 pages.

Patent Cooperation Treaty, "International Preliminary Report on Patentability," issued in connection with Application No. PCT/US2013/048111, Dec. 31, 2014, 5 pages.

METHODS AND APPARATUS TO PROVIDE FAILURE DETECTION

RELATED APPLICATIONS

This patent arises from a continuation of U.S. patent application Ser. No. 13/538,596, filed Jun. 29, 2012 (now U.S. Pat. No. 8,832,505). The entirety of U.S. patent application Ser. No. 13/538,596 is incorporated herein by reference.

GOVERNMENT INTEREST STATEMENT

This invention was made with Government support under contract number HR0011-10-3-0007 awarded by the Department of Defense. The Government has certain rights in this invention.

FIELD OF THE DISCLOSURE

The present disclosure relates generally to computer system platforms and, more particularly, to methods and apparatus to provide failure detection.

BACKGROUND

Large scale processing utilizes many processing cores to accomplish processing tasks. The efficiencies of large-scale processing machines may be measured at least in part by the amount of energy that is consumed by the machine to perform a number of instructions. Machines that use more energy to accomplish the same number of instructions are considered less efficient by a performance-per-energy unit measurement.

DETAILED DESCRIPTION

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Current processing systems assume that data reads and data writes to memory or remote machines do not fail at the hardware level, and make no provision for such reads and writes in the event a failure occurs. When a hardware error is detected, a machine-check exception is triggered which typically stops the entire processing system from performing any further processing until the system is rebooted. For future large-scale machines, such as data center machines and exascale computing systems (e.g., capable of performing on the order of 1 quintillion floating point operations per second), the assumption that data reads and data writes do not fail may not remain true. Current large-scale machines such as the petaFLOP machines (e.g., capable of performing on the order of 1 quadrillion floating point operations per second) have up times (e.g., lengths of time in continuous operation) measured in hours or small numbers of days before significant failures occur (failures that may require restarting the machine or a portion thereof). Future Exascale machines would multiply this problem by at least 1,000 times over petascale machines and may lead to short, less-useful up times.

Known methods for detecting data errors include providing hardware buffers for every data operation that is to communicate data to a location other than the core performing the data operation (e.g., a memory, another core) and mandating that every such data operation receive an acknowledgement (e.g., an ACK message) or a nonacknowledgement (e.g., a NAK message) to indicate a success or failure, respectively, of the data operation.

Example systems, methods, and articles of manufacture disclosed herein provide failure detection in computing systems by monitoring expected and observed data operations within a threshold time period. An example method includes executing, via a plurality of computing nodes, first fenced computing operations, storing a count of issued data operations resulting from the first fenced computing operations, and determining whether a failure condition exists in the plurality of computing nodes by comparing the count of issued data operations to a count of performed data operations resulting from the first fenced computing operations.

Example systems, methods, and articles of manufacture disclosed herein overcome the disadvantages of prior art methods by reducing the amount of hardware (e.g., circuitry, processor features, etc.) used to perform the failure detection. For machines having large numbers of processors (e.g., petascale machines, exascale machines, etc.), the hardware requirements of the prior art can become large and use significant amounts of power, and therefore reduce the performance-per-watt efficiency of such machines. In contrast, example systems, methods, and articles of manufacture disclosed herein may be implemented in software, in combination with timers and counters implemented in hardware and, thus, are more energy-efficient than prior art solutions.

Figure 1:
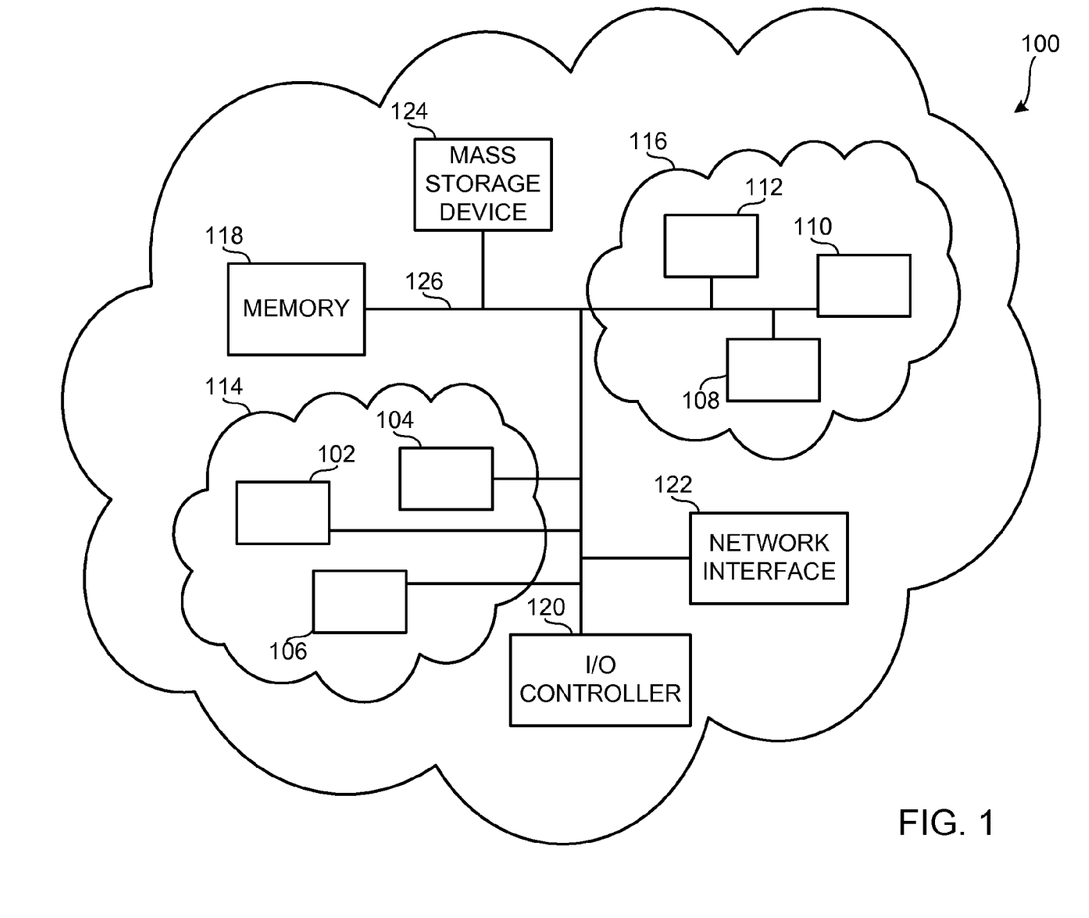
FIG. 1 is a block diagram illustrating example components of an example computing system to provide failure detection.

FIG. 1 is a block diagram illustrating example components of an example computing system 100 to provide failure detection. The example computing system 100 of FIG. 1 may be a large-scale computing system, such as a petascale or exascale computing system. However, the example computing system 100 may be implemented using other larger and/or smaller-scale systems.

The example computing system 100 of FIG. 1 includes multiple interconnected computing nodes 102-112. The computing nodes 102-112 of the illustrated example are configured to execute groups of computing operations defined by fences. As used herein, a "fence" refers to a logical barrier in instruction flow such that instructions logically subsequent to the fence (e.g., occurring after a fence marker in an execution order) are not permitted to be executed until the prior operations (e.g., data operations) from the instructions occurring prior to the fence have completed. Computing instructions may be contained within a fence to cause the computing nodes executing the fenced instructions to wait until the fenced instructions have been completed before advancing to further computing operations. Fences can guard data read operations, data write operations, and/or other types of traffic and/or control streams, depending on the type of fence and/or the instruction set of the system 100. A fence may affect one or more computing nodes. In some examples, a fence causes the nodes within the fence to monitor and verify data operations (e.g., data writes to local storage, data writes to remote storage, data reads from local storage, data reads from remote storage) to ensure the correctness of data operations. In the example of FIG. 1, the computing nodes 102-106 are configured in a first workload unit 114 and the computing nodes 108-112 are configured in a second workload unit 116. A workload unit refers to a physical and/or logical grouping of multiple processing nodes for the purpose of accomplishing a processing task. However, the computing nodes 102-112 are reconfigurable to use any combination(s) of the nodes 102-112 as one or more workload unit(s) to perform computing operations. The terms "workload unit," "workload group," "computing node tree," and "tree" are used interchangeably throughout this disclosure.

The example computing system 100 of FIG. 1 further includes a memory 118. The memory 118 is a shared memory and may include multiple physical and/or logical memories. The computing system 100 may include additional memories. The memory 118 and/or portions of the memory 118 may be reserved to a workload unit 114, 116 while performing a set of computing operations (e.g., to assure data integrity and consistency of the computing instructions). In some examples, the workload unit 114, 116 controlling the memory 118 synchronizes the data operations after a group of fenced computing operations has been performed.

For some sets of computing operations, a guarantee that data operations (e.g., reading data from the memory 118 and/or writing data to the memory 118) have been performed is used to ensure that subsequent computing instructions are being performed using the proper data. If the guaranteed data operations fail and/or are not confirmed, the computing operations and any resulting data operations may be reversed and/or otherwise corrected.

An I/O controller 120 performs functions that enable the computing nodes 102-112 to communicate with peripheral input/output (I/O) devices and a network interface 122. The I/O controller 120 may interface with any desired type of I/O device such as, for example, a keyboard, a video display or monitor, a mouse, etc. The network interface 122 may be, for example, an Ethernet device, an asynchronous transfer mode (ATM) device, an 802.11 device, a DSL modem, a cable modem, a cellular modem, etc. that enables the processor system 100 to communicate with another processor system. A mass storage memory 124 may include any desired type of mass storage device including hard disk drives, optical drives, tape storage devices, etc.

The example computing system 100 of FIG. 1 includes one or more interconnection buses 126 to communicatively couple the nodes 102-112, the workload units 114, 116, the memory 118, the I/O controller 120, the network interface 122, and/or the mass storage device 124. The example nodes 102-112 may transmit configuration information via the interconnection bus(es) 126 to, for example, configure and/or reconfigure the workload units 114, 116. The example nodes 102-112 additionally transmit data to other ones of the nodes 102-112, to the memory 118, and/or to the mass storage device 124. Because the memory 118 is coupled to multiple ones of the nodes 102-112, data conflicts and/or failures may arise and/or may be caused by hardware failures in the computing system 100. When such data conflicts and/or failures occur while performing computing operations, the example computing system 100 detects the failures and/or conflicts and performs corrective measures as described in more detail below.

The example nodes 102-112, the example memory 118, the example I/O controller 120, the example network interface 122, the example mass storage device 124, and/or any other components in the computing system 100 of FIG. 1 are interconnectable and logically separable to accomplish multitasking, multithreading, and/or any other type of specialized computing via the computing system 100. The examples described below will refer to the example workload unit 114 for example sets of fenced computing operations. However, the examples described herein are applicable to other sets of fenced computing operations, other workload units (e.g., the workload unit 116), other sizes and/or compositions of workload units, and/or any other configuration of the example computing system 100.

In a first phase of an example failure detection process by the computing system 100, the tree manager node 102 iterates (e.g., loops) a process of monitoring the nodes 102-106 in the workload unit 114, monitoring for the nodes 102-106 to have reported a status. In some examples, the nodes 102-106 report a status by writing (e.g., storing) a value to a designated location (e.g., a register) in the memory 118. The tree manager node 102 maintains a sum (e.g., count) of the total writes performed by the nodes 102-106. When the sum is determined (e.g., each of the nodes 102-106 has reported a value that must be correct because the sum is determined from each node's fenced operations), the tree manager node 102 then resets the nodes 102-106 in the tree to a value (e.g., −1). The tree manager node 102 further sets a flag (e.g., a variable) accessible to the nodes 102-106 in the unit 114 (e.g., to "true"). In a second phase of the example failure detection process, the nodes 102-106 respond by determining respective numbers of performed remote data write operations resulting from the performed computing operations. The tree manager node 102 compares the count of data operations observed by the nodes 102-106 (e.g., performed data operations) in the second phase to the number of total data operations issued by the nodes 102-106 in the first phase. If the number of observed data operations is equal to the number of issued data operations, the tree manager node 102 reports that the data operations are synchronized and the workload unit 114 may perform subsequent computing operations. On the other hand, if a watchdog timer interrupt occurs prior to the tree manager node 102 determining that the number of observed data operations is equal to the number of issued data operations, the tree manager node 102 determines that a failure condition exists and initiates corrective action.

Figure 2:
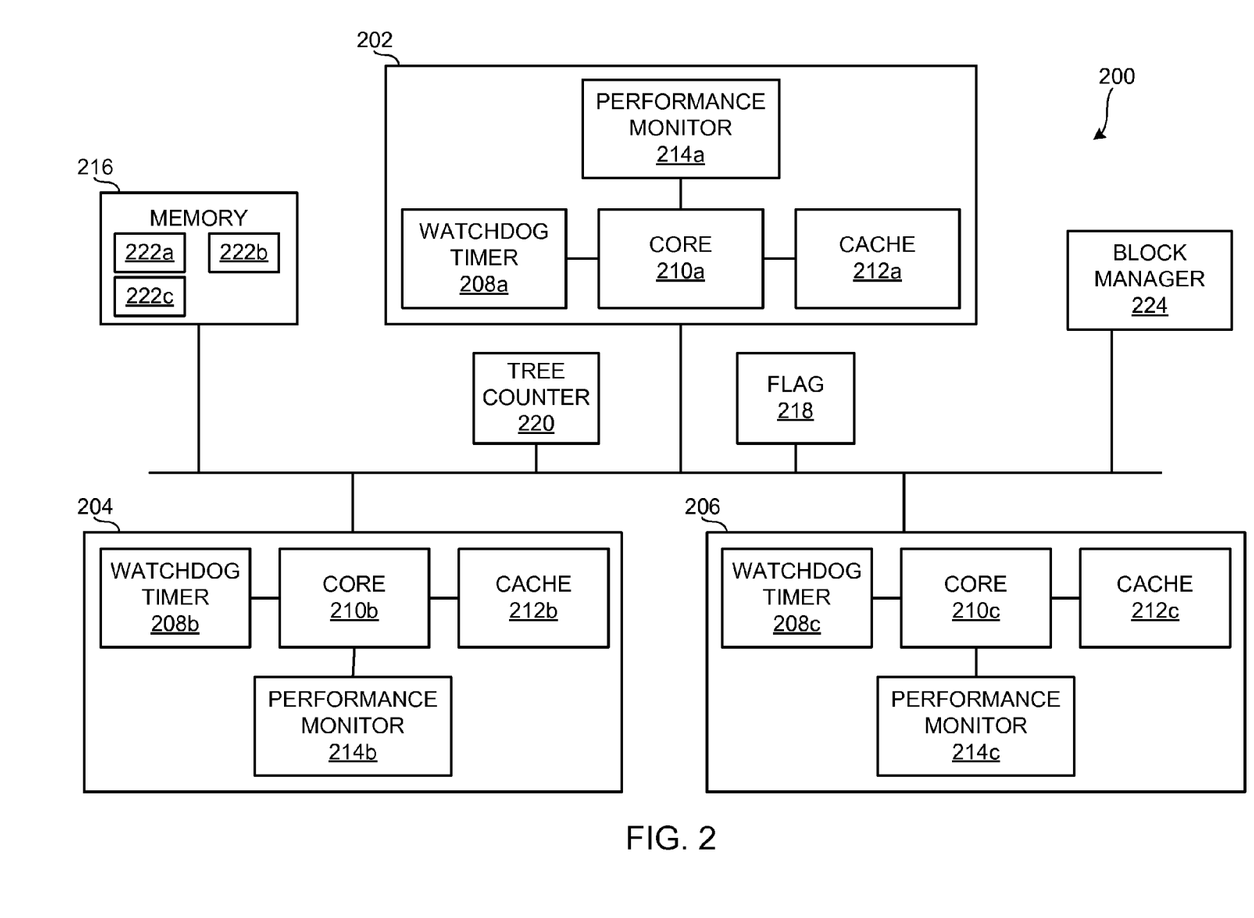
FIG. 2 is an example implementation of a workload unit.

FIG. 2 is an example implementation of a workload unit 200. The workload unit 200 of FIG. 2 may implement a workload unit 114, 116 of FIG. 1 to perform sets of computing operations. The example workload unit 200 of FIG. 2 includes multiple nodes 202, 204, 206. The example node 202 is assigned to be a tree manager node, and will be referred to as the tree manager node 202.

Each of the example nodes 202-206 includes a respective watchdog timer 208a-208c, a respective processing core 210a-210c, a respective cache 212a-212c, and a respective performance manager 214a-214c. The example watchdog timers 208a-208c count down and/or up, and may be set and/or reset to raise an interrupt or other event upon expiration of a threshold time. The threshold time may be set via computing instructions provided by a programmer. The example cores 210a-210c are processing cores that perform computing operations (e.g., execute computer instructions) and perform input and output (e.g., to the cache 212). The caches 212a-212c store data for access by the respective cores 210a-210c. The performance monitors 214a-214c count data operations (e.g., data read operations from local and/or remote locations, data write operations to local and/or remote locations) and generate interrupts in response to triggering events (e.g., when the count of data operations changes).

The example nodes 202-206 collectively have access to a memory 216. Access to the memory 216 of FIG. 2 may be reserved to the example workload unit 200 during one or more sets of instructions and then unreserved or reserved to a different computing node tree. Additionally, the example workload unit 200 includes a flag 218. The tree manager node 202 may set the flag 218 to a value as described below. In the example of FIG. 2, the flag 218 represents a Boolean variable (e.g., has a value of "true" or "false"). The example nodes 204, 206 read the state of the flag 218 and perform actions based on the state as described in more detail below. A tree counter 220 stores a count of a number of data operations issued by the nodes 202-206 while performing a fenced set of computing instructions.

In some examples, the value(s) to which the local watchdog timer(s) are set are based on a time within which a set of computing operations is expected to be executed, barring any failures.

Upon receiving a set of fenced computing operations, the example nodes 202-206 participating in the workload unit 200 attempt to drain (e.g., perform) any pending data operations to establish a known state for the workload unit 200. To establish the known state, each of the example nodes 202-206 in the workload unit 200 performs the following: 1) set a watchdog timer 208a-208c to a first value; 2) execute fenced computing operations while monitoring data operations; if a watchdog timer 208a-208c trigger interrupt occurs, a resiliency failure may be implied by the node 202-206; in response to the watchdog trigger interrupt, a failure correction or recovery task (e.g., a higher-privilege function, a check point roll back, self-diagnostics, etc.) is performed; 3) if the fenced computing operations complete before the watchdog timer 208a-208c is triggered (e.g., expires), reset the watchdog timer 208a-208c to the first value or to a different value; and 4) perform a synchronization process.

Each example node 202-206 has an assigned location 222a-222c in the memory 216. In the example of FIG. 2, each assigned location 222a-222c is a register capable of storing a signed 64-bit integer in memory, but may be a different size or type. When the workload unit 200 is formed (e.g., when the nodes 202-206 receive instructions to form the workload unit 200), each location 222a-222c is initialized with a value. In some examples, the memory locations 222a-222c are initialized with a value of −1. The example nodes 202-206 begin performing the set of computing operations as the operations are assigned to the nodes 202-206. While performing the computing operations, the performance monitors 214a-214c monitor the numbers of data operations (e.g., one or more types of data operations) issued by the cores 210a-210c as a result of performing the computing operations. After each node 202-206 completes the computing operations assigned to it, the node 202-206 executes a fence operation sequence. If the watchdog timers 208a-208c of the nodes 202-206 are not triggered, the nodes 202-206 may be instructed to synchronize its data operations with other nodes 202-206 before the fence is released. A fence is not released until each node 202-206 in the example workload unit 200 has synchronized.

To perform the synchronization sequence, each example node 202-206: 1) writes (e.g., stores) to its assigned location 222a-222c a number of data operations (e.g., data reads and/or data writes) that the node 202-206 performed while executing the set of computing operations; and 2) moves to a "spin-wait" (e.g., idle) state until the flag 218 is set to a value.

If the example tree manager node 202 has any computing operations to perform, the tree manager node 202 performs those computing operations before performing tree manager functions. When the tree manager node 202 completes any computing operations assigned to it, the tree manager node 202 resets the watch dog timer 208a. The example tree manager node 202 repeatedly monitors the other nodes 204, 206 in the workload unit 200 to determine whether the nodes 204, 206 have reported a status. In the example of FIG. 2, the nodes 204-206 report a status by writing a number of data operations to an assigned location 222b-222c in the memory 216. The example tree manager node 202 determines a sum of the total write operations performed by the nodes 202-206. When the nodes 202-206 in the workload unit 200 have reported corresponding numbers of data operations, the tree manager node 202 stores the sum in the tree counter 220. The tree manager node 202 then resets the values stored at the locations 222a-222c for the nodes 202-206 in the workload unit 200 to an initialized value (e.g., −1). The example tree manager node 202 sets the flag 218 to a value (e.g., "true").

At the time the tree manager node 202 sets the flag 218, the tree counter 220 stores a sum of the data operations (e.g., data write operations) that have occurred (e.g., been issued based on executed computing operations) within the workload unit 200. When the tree manager node 202 sets the flag 218 (e.g., to "true"), the other nodes 204-206 in the workload unit 200 enter a second phase and begin reporting a number of data operations that the nodes 204-206 observe being performed. If the computing operations and the resulting data operations are completed successfully, the tree manager node 202 identifies the number of data operations reported by the nodes 204-206 in the second phase as matching the sum of the data operations stored by the tree manager node 202 in the tree counter 220.

To report the number of observed data operations in the second phase, the example nodes 202-206 each perform the following: 1) set a trigger value for the performance monitor 214a-214c to a trigger threshold (e.g., 1), and set an alarm or interrupt signal to activate when any remote-generated (e.g., non-local, interconnect-delivered) data operation (e.g., data write) arrives at the node 202-206; 2) determine a count of remote-generated data operations observed by the performance monitor 214a-214c of the node 202-206, using an atomic exchange operation to atomically (e.g., simultaneously from the perspective of other components of the workload unit 200) reset the count of the performance monitor 214a-214c (e.g., to 0); 3) write to the assigned location 222a-222c for the node 202-206 the number of remote-generated data operations the node 202-206 has observed since the beginning of the most recent set of computing instructions; and 4) move to a spin-wait (e.g., idle) state until the flag 218 is set to a value (e.g., "true").

While the nodes 204-206 perform the above steps, the tree manager node 202 monitors the locations in the memory 216 corresponding to the nodes 204-206. The tree manager node 202 determines a sum of the data operations reported by the nodes 204-206 (e.g., an observed value) and compares the sum to the stored value in the tree counter 220 (e.g., an expected value). While the reported (e.g., observed) data operations do not match the sum of the data operations issued by the nodes 202-206 during performance of the computing operations, then there are still data operations to be performed somewhere in the computing system (e.g., in flight data operations) and/or a failure has occurred somewhere in the system. While the observed value does not equal the expected value, any remote data operation at a node 202-206 that has not been previously observed triggers the corresponding performance monitor 214a-214c trigger event that was previously set. In response to a trigger of the performance monitor 214a-214c, the node 202-206 corresponding to the triggered performance monitor 214a-214c updates the value at the assigned location 222a-222c for that node 202-206 in the memory 216. In some examples, the core 210a-210c updates the value at the assigned location 222a-222c, while in some other examples the performance monitor 214a-214c updates the value. The node 202-206 also resets the performance monitor 214a-214c event trigger and places the node 202-206 back into the spin-wait (e.g., idle) mode. In some examples, each of the nodes 202-206 iterates second phase steps 2-4 above while the flag 218 is not set (e.g., while the observed value is not equal to the expected value).

If any of the watchdog timers 208a-208c of any of the nodes 202-206 elapses before the count of observed data operations (e.g., writes) matches the sum of the data operations from the computing operations (e.g., the expected value), the nodes 202-206 determine and/or otherwise identify that a failure has occurred. In response to determining a failure, the example nodes 202-206 may initiate recovery and/or error-correction procedures (e.g., diagnostics, checkpoint replays, any appropriate method(s) for the particular system). On the other hand, if the count of observed data operations matches the sum of data operations from the computing operations (e.g., the expected value), the tree manager node 202 sets the flag 218 to indicate that the computing operations have become visible and that no failures have occurred. The flag 218 further indicates that the workload is allowed to resume forward progress (e.g., a new set of computing operations may be undertaken by the node(s) 202-206 and/or the workload unit 200).

In some examples, the nodes 202-206 update respective locations in the memory 216 with a location (e.g., an address) of a register to wake up that specific node 202-206. In other examples, the locations in the memory 216 are the same respective locations 222a-222c in memory (e.g., the same 64-bit registers) used by the nodes 202-206 to update the numbers of data operations. Once a node 202-206 has written a number of data operations into the tree, the node 202-206 may then choose to clock-gate itself off (directly and/or via request to higher-privilege layers). The tree manager node 202 may then wake up the nodes 204-206 when the workload unit 200 has reported a number of data operations, and/or to return control to the nodes 204-206 (e.g., to perform individual node processing, to perform post-synchronization overhead, etc.). In such examples, the performance monitors 214a-214c are operational in clock-gated behavior. Additionally, the performance monitors 214a-214c are able to wake up the respective nodes 202-206 (e.g., if incoming memory operations arrive for service).

In some examples in which explicit guarantees of behavior within a macro-block of nodes (e.g., a block of nodes different from the workload unit 200 and including one or more of the nodes 202-206) (or larger subset of the system) are provided by hardware, a manager 224 of the macro-block is included in the workload unit 200. The block manager 224 observes the total numbers of data operations included in and out of the block of nodes by monitoring (e.g., accessing and/or summing) the ingress tables and/or egress tables within the block. The performance monitors 214 located at the edges of the block of nodes, after fenced computing operations on the nodes in the block, have data operation counts that accurately reflect the total data operations of the nodes in the block. The block manager 224 enables a reduction in the size of the workload unit 200 and in the total messages exchanged between nodes in the workload unit 200.

While an example manner of implementing the computing platform 100 of FIG. 1 has been illustrated in FIG. 2, one or more of the elements, processes and/or devices illustrated in FIG. 2 may be combined, divided, re-arranged, omitted, eliminated and/or implemented in any other way. Further, the example nodes 202-206, the example watchdog timers 208, the example cores 210, the example caches 212, the example performance monitors 214, the example memory 216, the example flag 218, the example tree counter 220, and/or, more generally, the example workload unit 200 of FIG. 2 may be implemented by hardware, software, firmware and/or any combination of hardware, software and/or firmware. Thus, for example, any of the example nodes 202-206, the example watchdog timers 208, the example cores 210, the example caches 212, the example performance monitors 214, the example memory 216, the example flag 218, the example tree counter 220 and/or, more generally, the example workload unit 200 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example nodes 202-206, the example watchdog timers 208, the example cores 210, the example caches 212, the example performance monitors 214, the example memory 216, the example flag 218, and/or the example tree counter 220 are hereby expressly defined to include a tangible medium such as a memory, DVD, CD, etc. storing the software and/or firmware. Further still, the example nodes 202-206, the example watchdog timers 208, the example cores 210, the example caches 212, the example performance monitors 214, the example memory 216, the example flag 218, the example tree counter 220 and/or, more generally, the example workload unit 200 of FIG. 2 may include one or more elements, processes and/or devices in addition to, or instead of, those illustrated in FIG. 1, and/or may include more than one of any or all of the illustrated elements, processes and devices.

Figure 3:
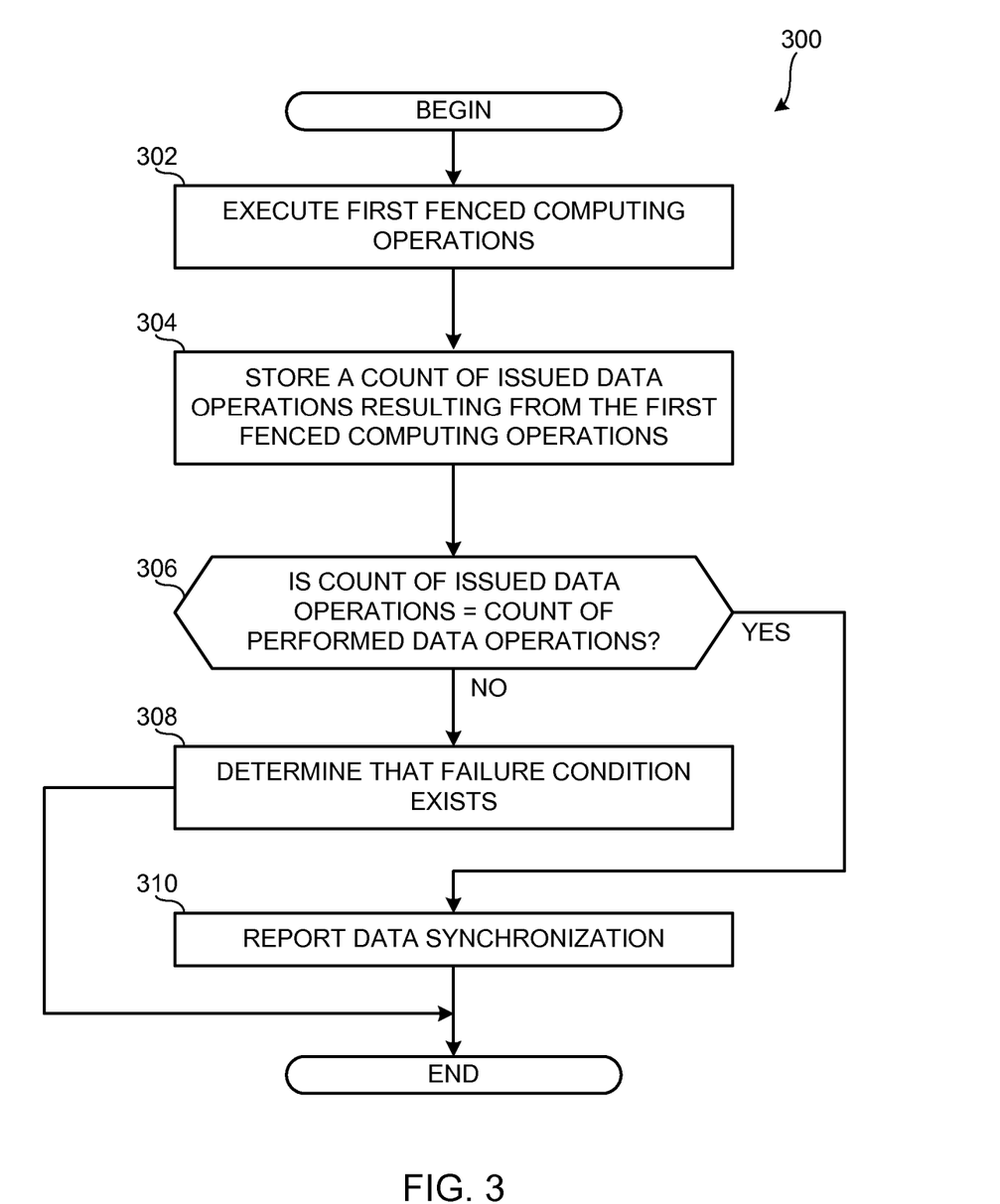
FIG. 3 is a flow diagram representative of an example process that may be implemented using example machine readable instructions that may be executed to implement the example workload unit of FIG. 2 to provide failure detection.
Figure 4:
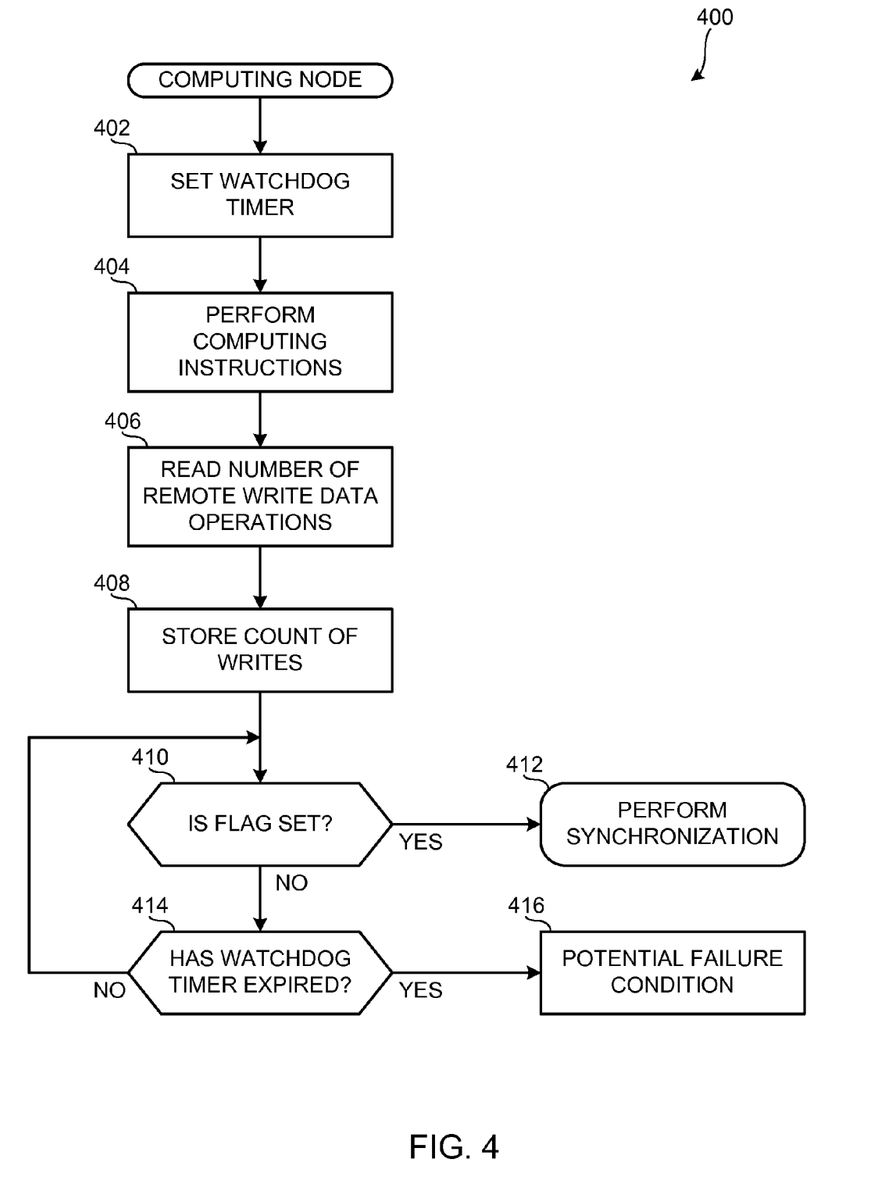
FIG. 4 is a flow diagram representative of an example process that may be implemented using example machine readable instructions that may be executed to implement any of the example computing nodes of FIGS. 1 and 2 to provide a count of issued data operations resulting from performed computing operations.
Figure 5:
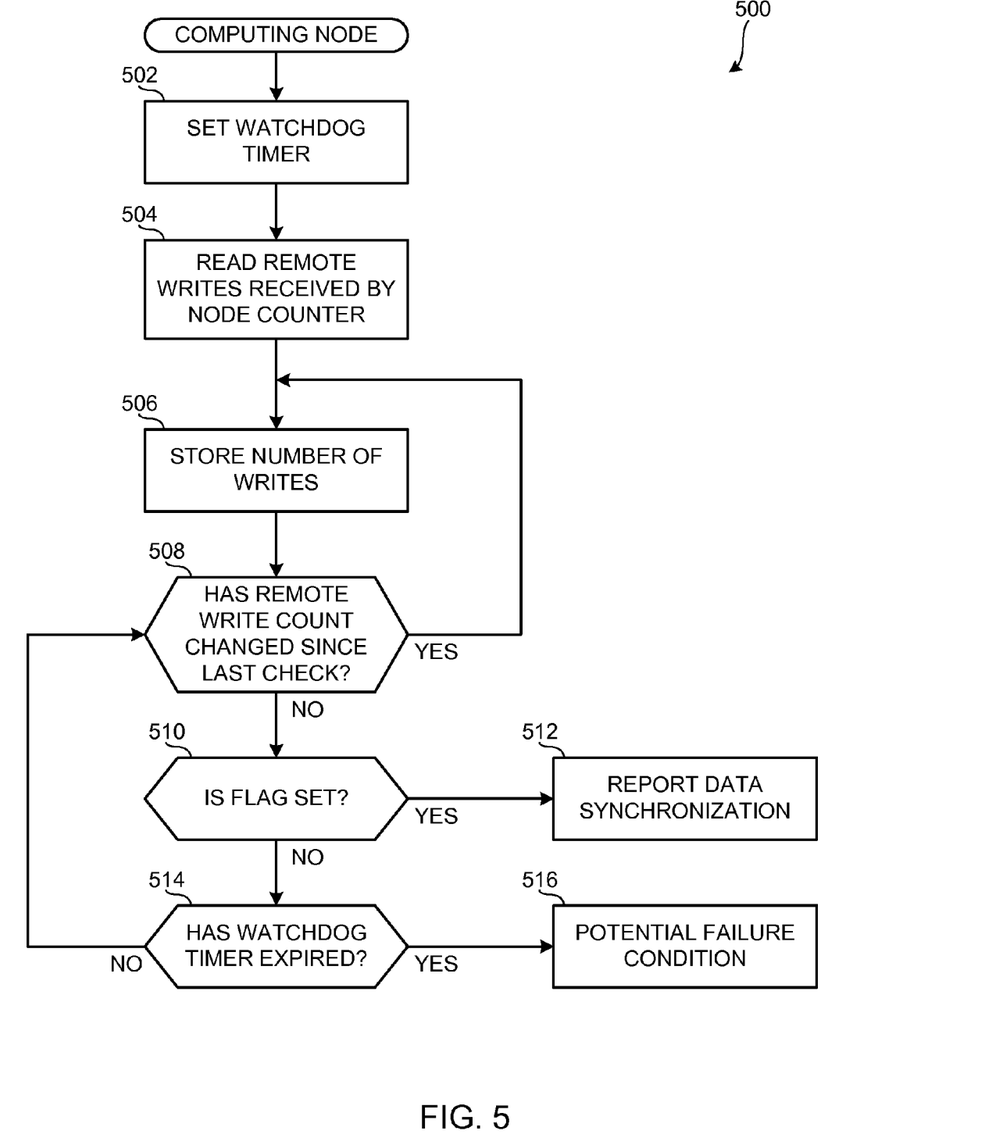
FIG. 5 is a flow diagram representative of an example process that may be implemented using example machine readable instructions that may be executed to implement any of the example computing nodes of FIGS. 1 and 2 to provide a count of performed data operations.
Figure 6:
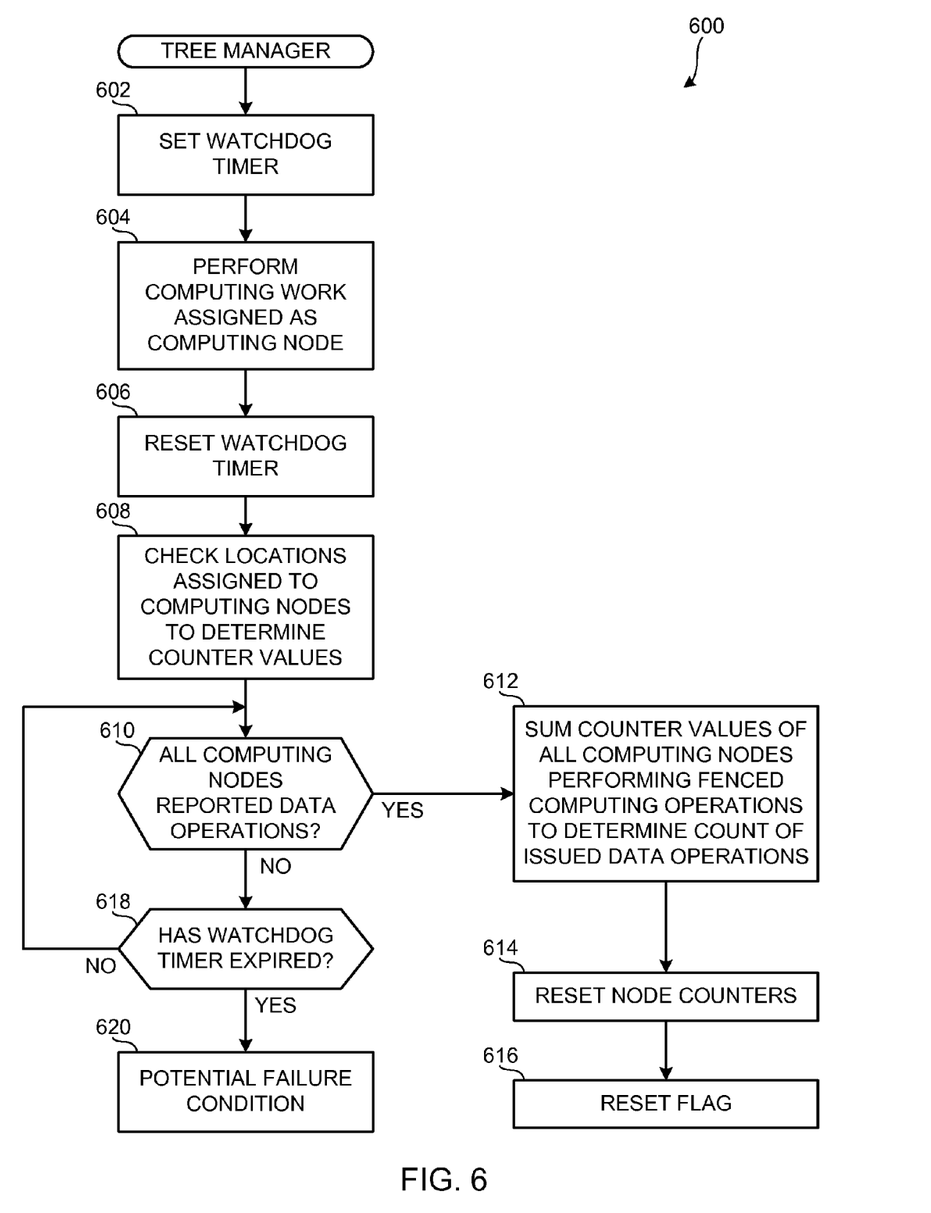
FIG. 6 is a flow diagram representative of an example process that may be implemented using example machine readable instructions that may be executed to implement the example tree manager node of FIG. 2 to determine a count of issued data operations resulting from performed computing operations.
Figure 7:
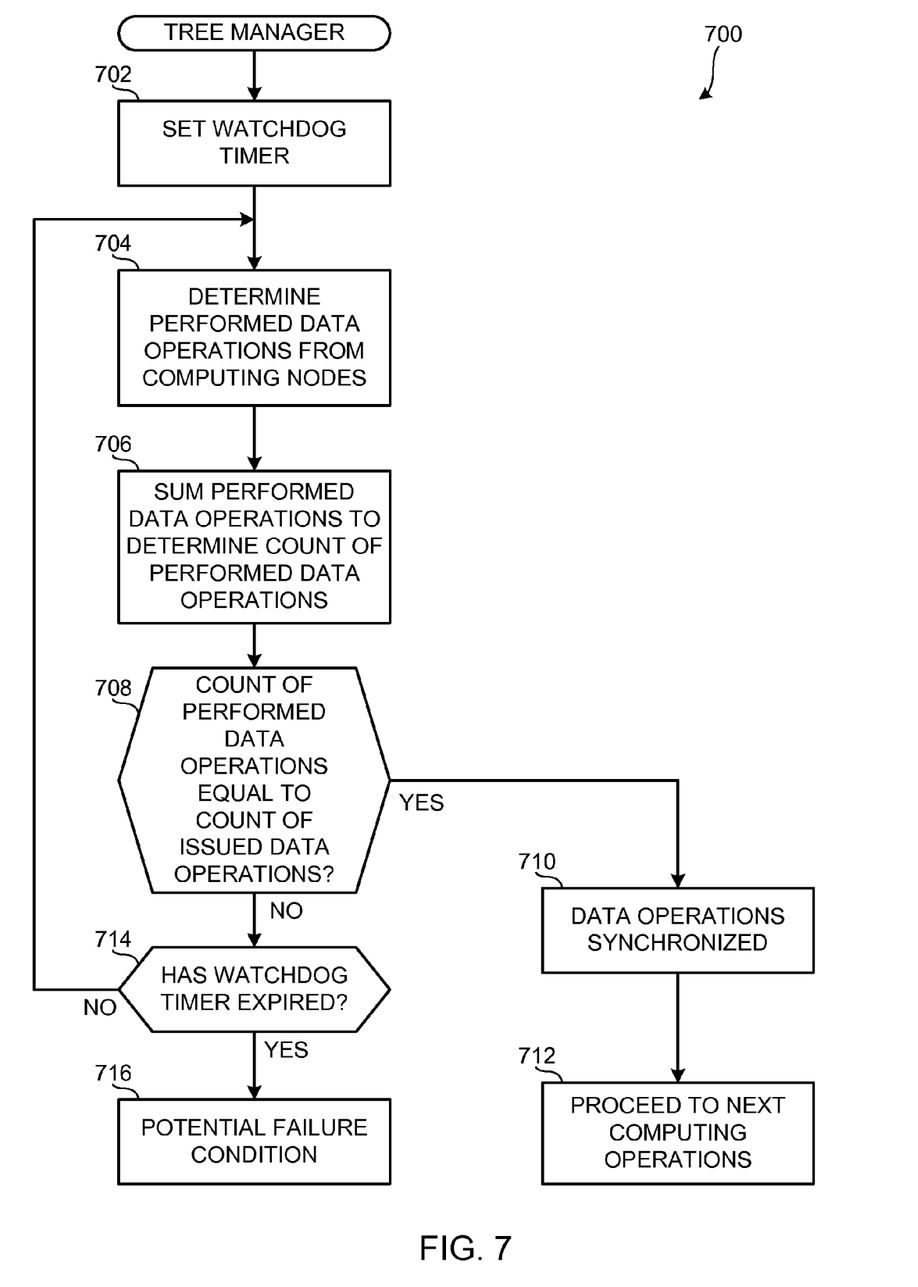
FIG. 7 is a flow diagram representative of an example process that may be implemented using example machine readable instructions that may be executed to implement the example tree manager node of FIG. 2 to determine a count of performed data operations.

FIG. 3 is a flow diagram representative of an example process that may be implemented using example machine readable instructions that may be executed to implement the example workload unit 200 of FIG. 2 to provide failure detection. FIG. 4 is a flow diagram representative of an example process that may be implemented using example machine readable instructions that may be executed to implement any of the example computing nodes 202-206 of FIGS. 1 and 2 to provide a count of data operations resulting from performed computing operations. FIG. 5 is a flow diagram representative of an example process that may be implemented using example machine readable instructions that may be executed to implement any of the example computing nodes 202-206 of FIGS. 1 and 2 to provide a count of performed data operations. FIG. 6 is a flow diagram representative of an example process that may be implemented using example machine readable instructions that may be executed to implement the example tree manager node 202 of FIG. 2 to determine a count of data operations resulting from performed computing operations. FIG. 7 is a flow diagram representative of an example process that may be implemented using example machine readable instructions that may be executed to implement the example tree manager node 202 of FIG. 2 to determine a count of performed data operations. The example processes of FIGS. 3-7 may be performed using a processor, a controller and/or any other suitable processing device. For example, the example processes of FIGS. 3-7 may be implemented using coded instructions (e.g., computer readable instructions) stored on a tangible computer readable storage medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 3-7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 3-7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 3-7 may be implemented manually or as any combination(s) of any of the foregoing techniques, for example, any combination of firmware, software, discrete logic and/or hardware. Further, although the example processes of FIGS. 3-7 are described with reference to the flow diagrams of FIGS. 3-7, other methods of implementing the processes of FIGS. 3-7 may be employed. For example, the order of execution of the blocks may be changed, and/or some of the blocks described may be changed, eliminated, sub-divided, or combined. Additionally, any or all of the example processes of FIGS. 3-7 may be performed sequentially and/or in parallel by, for example, separate processing threads, processors, devices, discrete logic, circuits, etc.

FIG. 3 is a flow diagram representative of an example process 300 that may be implemented using example machine readable instructions that may be executed to implement the example workload unit 200 of FIG. 2 to provide failure detection. While the example process 300 of FIG. 3 is described below with reference to the example workload unit 200, the process 300 may be implemented by computing trees having different numbers of nodes and/or different sets of computing instructions.

The example process 300 begins with the nodes 202-206 executing first fenced computing operations (block 302). Example fenced computing operations include computing operations in which data operations (e.g., reads from the memory 216, writes to the memory 216) are monitored and/or computing operations in which a computing resource (e.g., the memory 216) is reserved to the nodes 202-206. The example node 202 (e.g., the tree manager node) stores a count of data operations resulting from the first fenced computing operations (e.g., an expected count) (block 304). Storing the count may include, for example, temporarily storing the count in a cache or other short term memory and/or storing the count in a mass storage device.

The example tree manager node 202 determines whether a count of data operations (e.g., the expected count, a count of attempted data operations) is equal to a count of performed data operations (e.g., an observed count) (block 306). For example, the tree manager node 202 may determine a count of performed data operations observed by the nodes 202-206 and compare the count of performed data operations (e.g., the observed count) to the stored count of expected data operations. If the count of expected data operations is not equal to the count of performed (e.g., observed) data operations (block 306), the example tree manager node 202 determines that a failure condition exists (block 308). On the other hand, if the tree manager node 202 determines that the expected count of data operations is equal to the count of performed (e.g., observed) data operations (block 306), the tree manager node 202 reports a data synchronization (block 310). A data synchronization may, for example, signal that the workload unit 200 has successfully executed a set of computing instructions and successfully performed data operations associated with the computing instructions.

FIG. 4 is a flow diagram representative of an example process 400 that may be implemented using example machine readable instructions that may be executed to implement any of the example computing nodes 202-206 of FIGS. 1 and 2 to provide a count of data operations resulting from performed computing operations. The example process 400 of FIG. 4 is described with reference to one of the example nodes 204 of FIG. 2. However, the example process 400 may be performed by any or all of the example nodes 202-206 (e.g., individually).

The example process 400 begins by setting a watchdog timer (e.g., the watchdog timer 208a-208c of FIG. 2) (block 402). The watchdog timer 208a-208c may be set to a value that enables the core 210 to complete a set of computing instructions. The example node 204 (e.g., via the core 210) performs computing instructions (block 404). For example, the node 204 may be assigned a subset of computing instructions that are assigned to the workload unit 200.

The example performance monitor 214 reads a number of remote write data operations (block 406). For example, the core 210 increments a counter for the node 204 (e.g., a counter in the cache 212 and/or a counter in the performance monitor 214). The example performance monitor 214 may read the value in the counter and/or reset the counter. The performance monitor 214 stores the count of remote write data operations (block 408). For example, the performance monitor 214 stores the count of writes to an assigned location 222a-222c in the memory 216 of FIG. 2.

The example performance monitor 214 determines whether a flag is set (block 410). For example, the node 204 may enter a spin-wait or idle state while the performance monitor 214 determines whether the flag 218 of FIG. 2 has been set (e.g., to a value "true") by the tree manager node 202. If the flag is set (block 410), the example node 204 performs synchronization (e.g., data synchronization) (block 412). An example process to perform the synchronization is described below with reference to FIG. 5.

If the flag has not been set (block 410), the example performance monitor 214 determines whether the watchdog timer 208a-208c has expired (block 414). If the watchdog timer 208a-208c has expired (block 414), the performance monitor 214 reports a potential failure condition (block 416). The potential failure condition may result in determining whether the watchdog timer 208a-208c was not set appropriately and/or may result in error-correcting, failure reporting, and/or recovery actions being taken by the node 204 and/or by a computer system of which the node 204 is a part.

If the watchdog timer 208a-208c has not expired (block 414), control returns to block 410 to determine if the flag is set. The example node 204 may therefore remain in a spin-wait mode while waiting for the flag 218 to be set or for the watchdog timer 208a-208c of the node 204 to expire.

FIG. 5 is a flow diagram representative of an example process 500 that may be implemented using example machine readable instructions that may be executed to implement any of the example computing nodes 202-206 of FIGS. 1 and 2 to perform synchronization. The example process 500 of FIG. 5 may be used to implement block 412 of FIG. 4 for a computing node (e.g., the computing node 204 of FIG. 2).

The example process 500 begins by setting a watchdog timer (e.g., the watchdog timer 208a-208c of FIG. 2) (block 502). The watchdog timer 208a-208c may be set to a value that enables the data operations from previously-executed computing instructions to be successfully performed. The example performance monitor 214 reads a number of remote write operations (e.g., writing data to locations other than the cache 212 or the memory 216) (block 504). The number of remote write operations may be stored in a location such as the cache 212 or in a register in the performance monitor 214, and incremented by the core 210 when a remote write operation is performed or observed by the core 210. The number of remote write operations is monitored by the performance monitor 214 and stored in a location such as the cache 212 or in a register in the performance monitor 214. The performance monitor 214 stores the number of writes (block 506). For example, the performance monitor 214 may store the number of writes in an assigned (e.g., designated) location 222a-222c in the memory 216. In the example of FIG. 2, the example node 204 is assigned a particular signed 64-bit register in the memory 216, to which the performance monitor 214b stores the number of writes.

The example performance monitor 214b of the node 204 determines whether the remote write count has changed since the count was last checked by the performance monitor 214 (block 508). For example, the performance monitor 214b may check the remote write count (e.g., in the cache 212b, in a register, etc.) periodically, aperiodically, at particular times, in response to events, and/or otherwise non-continuously. If the remote write count has changed (block 508), control returns to block 506 to store the updated number of writes (e.g., in the assigned location 222a-222c in memory 216). In the example process 500, the performance monitor 214b overwrites the location 222a-222c in memory 216 with the updated count of remote writes. In some examples, the performance monitor 214b issues an interrupt to cause the core 210b to store and/or update the count of remote writes.

If the remote write count has not changed (block 508), the example performance monitor 214 determines whether the flag 218 has been set (block 510). For example, the flag 218 is set when the tree manager node 202 for the workload unit 200 to which the node 204 belongs determines that the count of data operations performed is equal to the number of data operations that were issued during execution of a set of computing instructions. If the flag has been set (block 510), the example node 204 reports a data synchronization (block 512). In some examples, the node 204 reports the data synchronization by becoming available to receive a configuration and/or to execute further computing instructions.

If the flag 218 is not set (block 510), the example performance monitor determines whether the watchdog timer 208a-208c for the node 204 has expired (block 514). If the watchdog timer 208a-208c has expired (block 514), the example performance monitor 214 reports a potential failure condition (block 516). The potential failure condition may result in determining whether the watchdog timer 208a-208c was not set appropriately and/or may result in error-correcting, failure reporting, and/or recovery actions being taken by the node 204 and/or by a computer system of which the node 204 is a part. If the watchdog timer 514 has not expired (block 514), control returns to block 508 to determine whether the remote write count has changed.

FIG. 6 is a flow diagram representative of an example process 600 that may be implemented using example machine readable instructions that may be executed to implement the example tree manager node 202 of FIG. 2 to determine a count of expected data operations. The example process 600 of FIG. 6 may be performed simultaneously with performance of the example process 400 of FIG. 4 by one or more other nodes 204, 206 in a workload unit 200.

The example process 600 begins by setting a watchdog timer 208a (block 602). For example, the watchdog timer 208a is set to a value that permits the core 210 to perform any computing instructions that are assigned to the tree manager node 202 for execution. The example tree manager node 202 performs computing work assigned to the tree manager node 202 as a computing node (block 604). For example, the node 202 executes computing instructions in addition to acting as the tree manager for the workload unit 200.

The example node 202 then resets the watchdog timer 208a (block 606). The watchdog timer 208a may be reset to a value that enables the nodes 204-206 in the workload unit 200 to perform assigned computing instructions and to report respective numbers of data operations. The example tree manager node 202 (e.g., via the performance monitor 214 and/or via the core 210) checks the locations 222a-222c assigned to the computing nodes 202-206 to determine counter values (block 608). For example, the tree manager node 202 may check each location 222a-222c in memory 216 that is assigned to a node 202-206 to determine whether any of the nodes 202-206 has not reported a counter value (e.g., block 408 of FIG. 4).

The example tree manager node 202 determines whether all of the computing nodes 202-206 (e.g., in the workload unit 200) have reported data operations (block 610). For example, the tree manager node 202 may determine whether any locations 222a-222c assigned to the nodes 202-206 in the memory 216 still have a default value (e.g., −1 or another value that indicates a node 202-206 has not modified the value). If all of the computing nodes 202-206 in the workload unit 200 have reported the data operations (block 610), the example tree manager node 202 sums the counter values of all the computing nodes 202-206 performing fenced computing operations to determine a count of issued data operations (block 612). The count of data operations performed in block 612 may additionally or alternatively be considered a number of "expected" data operations. In some examples, the count of issued data operations includes particular type(s) of data operations, such as remote data write operations, and excludes other type(s) of data operations. In some examples, the tree manager node 202 stores the determined count of issued data operations in the tree counter 220.

Having determined the count of issued data operations, the example tree manager node 202 resets the node counters (block 614). For example, the tree manager node 202 may reset the locations 222a-222c assigned to the nodes 202-206 in the memory 216 to a default (e.g., initial) value, such as −1. The example tree manager node 202 then resets the flag 218 (block 616). Resetting the flag 218 is observed by the nodes 204-206 (e.g., block 410 of FIG. 4) to cause the nodes 204-206 to perform a data synchronization.

If any computing nodes 202-206 have not reported data operations (block 610), the tree manager node 202 determines whether the watchdog timer 208a has expired (block 618). If the watchdog timer 208a has expired (block 618), the example tree manager node 202 reports a potential failure condition (block 620). The failure condition may cause an evaluation of the watchdog timer 208a to determine whether an appropriate value was set, and/or may result in error-correcting, failure reporting, and/or recovery actions being invoked.

FIG. 7 is a flow diagram representative of an example process 700 that may be implemented using example machine readable instructions that may be executed to implement the example tree manager node 202 of FIG. 2 to determine a count of performed data operations. The example process 700 of FIG. 7 may be performed simultaneously with performance of the example process 500 of FIG. 5 by one or more other nodes 204, 206 in a workload unit 200.

The example process 700 begins by setting a watchdog timer (e.g., the watchdog timer 208a of FIG. 2) (block 702). The watchdog timer 208a may be set to a value that enables the data operations from previously-executed computing instructions to be successfully performed. The example tree manager node 202 determines performed (e.g., observed) data operations from the computing nodes (block 704). For example, the tree manager node 202 may monitor the locations 222a-222c assigned to the nodes 202-206 in the memory 216. The tree manager node 202 sums the performed data operations to determine a count of performed data operations (block 706). For example, the tree manager node 202 may determine the count of performed data operations by summing the values stored in the locations 222a-222c assigned to the nodes 202-206 in the memory 216. The count of performed data operations may be considered the "observed operations." In some examples, the tree manager node 202 updates the count of performed data operations based on updated values in the locations 222a-222c.

The example tree manager node 202 determines whether the count of performed (e.g., observed) data operations (e.g., block 706) is equal to a count of issued data operations (e.g., the count determined in block 612 of FIG. 6, a value stored in the tree counter 220 of FIG. 2) (block 708). For example, the core 210 or the performance monitor 214 of the tree manager node 202 may compare the count of performed data operations to a value stored in the tree counter 220. If the count of count data operations is equal to the count of issued data operations (block 708), the tree manager node 202 reports that data operations are synchronized (block 710). The example workload unit 200 proceeds to a next set of computing operations (block 712). In some examples, block 712 may be performed by setting the flag 218 to a value (e.g., "true"). The next set of computing operations may be performed by the same workload unit 200 or by one or more of the nodes 202-206 in the workload unit 200 as part of the same workload unit 200 or a different workload group.

If the count of performed data operations is not equal to the count of data operations (block 708), the example tree manager node 202 determines whether the watchdog timer 208a (e.g., the watchdog timer 208a of the tree manager node 202) has expired (block 714). If the watchdog timer 208a has not expired (block 714), control returns to block 704 to determine the numbers of performed data operations from the computing nodes 202-206. If the watchdog timer 208a has expired (block 714), the example tree manager node 202 reports a potential failure condition (block 716). The failure condition may cause an evaluation of the watchdog timer 208a to determine whether an appropriate value was set, and/or may result in error-correcting, failure reporting, and/or recovery actions being invoked.

Example methods include executing, via a plurality of computing nodes, first fenced computing operations, storing a count of issued data operations resulting from the first fenced computing operations, and determining whether a failure condition exists in the plurality of computing nodes by comparing the count of issued data operations to a count of performed data operations resulting from the first fenced computing operations. Some example methods further include setting a watchdog timer to a first value and determining that the failure condition exists when the watchdog timer reaches a threshold value prior to the count of issued data operations being equal to the count of performed data operations. In some example methods, the data operations include at least one of reading data from a storage remote to the plurality of computing nodes or writing data to the storage remote to the plurality of computing nodes.

Some example methods further include causing at least one of the plurality of computing nodes to enter an idle state prior to monitoring the count of performed data operations, and setting a flag when the plurality of computing nodes have performed the first fenced computing operations, the monitoring to occur in response to setting the flag. In some examples, storing the count of issued data operations includes determining that each of the plurality of computing nodes has stored a respective number of issued data operations resulting from a respective portion of the first fenced computing operations, where the count includes a sum of the respective numbers of the issued data operations from the plurality of computing nodes. Some example methods further include monitoring the count of performed data operations by identifying a change in a second count of performed data operations for a first one of the plurality of computing nodes, storing the second number in response to the change, and updating the count of performed data operations based on the second number. Some example methods further include reporting that a data synchronization has occurred when the count of issued data operations is equal to the count of performed data operations.

Disclosed example systems include a plurality of first computing nodes to cooperate to perform first fenced computing operations, to store respective first numbers of issued data operations resulting from the first fenced computing operations, and to monitor second numbers of performed data operations resulting from the first fenced computing operations, and a second computing node to determine a count of issued data operations based on the first numbers of issued data operations, to determine a count of performed data operations based on the second numbers, and to determine whether a failure condition exists by comparing the count of issued data operations to the count of performed data operations. Some example systems further include a memory, where the first numbers of issued data operations include at least one of data read operations from the memory by the computing nodes or data write operations to the memory by the computing nodes.

In some example systems, the count of performed data operations includes at least one of data read operations from the memory by third computing nodes other than the first computing nodes or the second computing node or data write operations to the memory by the third computing nodes. In some example systems, the first plurality of computing nodes are to store the respective first numbers of issued data operations in respective locations in the memory.

In some examples, a first one of the first plurality of computing nodes includes a processing core to identify a performed data operation, and a performance monitor to, in response to the processing core identifying the data operation, perform at least one of storing one of the second numbers of performed data operations in a designated memory location or updating the one of the second numbers of performed data operations in the designated memory location. In some example systems, a first one of the first plurality of computing nodes includes a processing core to perform a computing operation and to issue one or more data operations based on the computing operation, and a performance monitor to, in response to the processing core issuing the data operation, determine a number of the one or more data operations and store the determined number in a designated memory location.

Some example systems further include a flag, where the second computing node is to set the flag to a value in response to determining the count of issued data operations and the plurality of first computing nodes are to monitor the second numbers of performed data operations in response to the second computing node setting the flag to the value. In some examples, the second computing node is to set the flag to the value or a second value in response to comparing the count of issued data operations to the count of the performed data operations, the plurality of first computing nodes to determine that a data synchronization has occurred in response to the second computing node setting the flag to the value or the second value.

Disclosed example tangible computer readable storage media store instructions that, when executed, cause a machine to at least execute, via a plurality of computing nodes, first fenced computing operations, store a count of issued data operations resulting from the first fenced computing operations, and determine whether a failure condition exists in the plurality of computing nodes by comparing the count of issued data operations to a count of performed data operations resulting from the first fenced computing operations. In some examples, the instructions further cause the machine to set a watchdog timer to a first value and determine that the failure condition exists when the watchdog timer reaches a threshold value prior to the count of issued data operations being equal to the count of performed data operations.

In some examples, the data operations include at least one of reading data from a storage remote to the plurality of computing nodes or writing data to the storage remote to the plurality of computing nodes. Some example instructions further cause the machine to cause at least one of the plurality of computing nodes to enter an idle state prior to monitoring the count of performed data operations, and set a flag when the plurality of computing nodes have performed the first fenced computing operations, the monitoring to occur in response to setting the flag. In some examples, storing the count of issued data operations includes determining that each of the plurality of computing nodes has stored a respective number of data operations resulting from a respective portion of the first fenced computing operations, where the count includes a sum of the respective numbers of the data operations from the plurality of computing nodes.

In some examples, monitoring the count of performed data operations includes identifying a change in a second count of performed data operations for a first one of the plurality of computing nodes, storing the second number in response to the change, and updating the count of performed data operations based on the second number. In some examples, the instructions further cause the machine to report that a data synchronization has occurred when the count of issued data operations is equal to the count of performed data operations.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to synchronize data operations between multiple workload units in a computing device to facilitate failure detection in the computing device, the method comprising:
    identifying a number of first data operations to write data from a computing node in a first workload unit to locations that are not in a local cache of the computing node and are not in a memory of the first workload unit, the first data operations corresponding to a set of computing instructions that are assigned to the first workload unit; and
    when a flag in the first workload unit has been set to a first value, synchronizing the first data operations with second data operations by a second workload unit.

2. A method as defined in claim 1, further including:
    storing the number of the first data operations; and causing the computing node to enter an idle state after storing the number and until the flag has been set to the first value.

3. A method as defined in claim 1, wherein the synchronizing of the data operations includes:
resetting the flag to a second value;
identifying a number of third data operations that have been performed by the computing node;
storing, in the memory of the first workload unit, the number of the third data operations that have been performed; and
when the flag in the first workload unit has been set to the first value after resetting the flag to the second value, reporting a data synchronization by the first workload unit.

4. A method as defined in claim 3, wherein the third data operations include operations to write data to the locations that are not in the local cache and are not in the memory of the first workload unit.

5. A method as defined in claim 3, further including, after resetting the flag to the second value, setting the flag to the first value when a total number of data operations to write data from the computing node to locations that are not in the first workload unit is equal to a total number of performed data operations writing data to the locations outside of the first workload unit.

6. A method as defined in claim 1, further including setting the flag to the first value in response to a plurality of computing nodes in the first workload unit, including the computing node, reporting respective numbers of first data operations.

7. A method as defined in claim 1, further including determining whether a watchdog timer has elapsed when the flag is not set to the first value.

8. A workload unit for a computing device, the workload unit comprising:
a memory; and
a set of computing nodes, a first one of the computing nodes including:
a processing core to perform a set of computing instructions;
a local cache; and
a performance monitor to:
identify a number of first data operations to write data from the first computing node to locations that are not in the local cache and are not in the memory of the first computing node, the first data operations corresponding to a set of computing instructions that are assigned to the workload unit; and
when a flag in the first workload unit has been set to a first value, synchronize the first data operations with second data operations by a second workload unit of the computing device.

9. A workload unit as defined in claim 8, wherein the performance monitor is to store the number of the first data operations in the memory, and the first computing node is to enter an idle state after storing the number and until the flag has been set to the first value.

10. A workload unit as defined in claim 8, wherein the first computing node is to reset the flag to a second value, and the performance monitor is further to:
read a number of third data operations that have been performed by the first computing node; and
store the number of the third data operations in the memory of the workload unit, the first one of the computing nodes to report a data synchronization by the first one of the computing nodes when the flag has been set to the first value after the flag has been reset to the second value.

11. A workload unit as defined in claim 10, wherein the third data operations include operations to write data to the locations other than the local cache or the memory.

12. A workload unit as defined in claim 10, wherein the first computing node is to, after resetting the flag to the second value, set the flag to the first value when a total number of data operations to write data from the computing nodes to locations outside of the workload unit is equal to a total number of performed data operations writing data to the locations outside of the workload unit.

13. A workload unit as defined in claim 8, wherein the first one of the computing nodes is to set the flag to the first value in response to all of the computing nodes in the workload unit reporting respective numbers of first data operations.

14. A workload unit as defined in claim 8, wherein the performance monitor is to determine whether a watchdog timer has elapsed when the flag is not set to the first value.

15. At least one tangible computer readable storage medium comprising instructions that, when executed, cause at least one machine to at least:
identify a number of first data operations to write data from a computing node in a first workload unit to locations that are not in a local cache of the computing node and are not in a memory of the first workload unit, the first data operations corresponding to a set of computing instructions that are assigned to the first workload unit; and
when a flag in the first workload unit has been set to a first value, synchronizing the first data operations with second data operations by a second workload unit.

16. At least one storage medium as defined in claim 15, wherein the instructions are further to cause the at least one machine to:
reset the flag to a second value;
identify a number of third data operations that have been performed by the computing node;
identify the number of the third data operations that have been performed in the memory of the first workload unit; and
when the flag in the first workload unit has been set to the first value after resetting the flag to the second value, report a data synchronization by the first workload unit.

17. At least one storage medium as defined in claim 16, wherein the third data operations include operations to write data to the locations that are not in the local cache and are not in the memory of the first workload unit.

18. At least one storage medium as defined in claim 16, wherein the instructions are further to cause the at least one machine to, after resetting the flag to the second value, set the flag to the first value when a total number of data operations to write data from the computing node to locations that are not in of the workload unit is equal to a total number of performed data operations writing data to the locations that are not in the workload unit.

19. At least one storage medium as defined in claim 15, wherein the instructions are further to cause the at least one machine to set the flag to the first value in response to a plurality of computing nodes in the first workload unit, including the computing node, reporting respective numbers of first data operations.

20. At least one storage medium as defined in claim 15, wherein the instructions are further to cause the at least one machine to determine whether a watchdog timer has elapsed when the flag is not set to the first value.

* * * * *